(12) United States Patent  
Suzuki et al.

(10) Patent No.: US 7,817,167 B2
(45) Date of Patent: Oct. 19, 2010

(54) METHOD AND APPARATUS FOR PROCESSING INFORMATION

(75) Inventors: Masahiro Suzuki, Kawasaki (JP); Toshikazu Ohshima, Kawasaki (JP); Toshihiro Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 11/165,635

(22) Filed: Jun. 24, 2005

(65) Prior Publication Data

US 2005/0285879 A1    Dec. 29, 2005

(30) Foreign Application Priority Data

Jun. 29, 2004 (JP) ............................. 2004-191626
Apr. 19, 2005 (JP) ............................. 2005-120914

(51) Int. Cl.
G09G 5/00    (2006.01)

(52) U.S. Cl. ...................... 345/633; 345/619; 345/629

(58) Field of Classification Search ................ 345/427, 345/633, 619, 629; 715/757; 33/286
See application file for complete search history.

(56) References Cited

U.S. PATENT DOCUMENTS

| | | | |
|---|---|---|---|
| 6,792,370 B2 | 9/2004 | Satoh | |
| 6,803,928 B2* | 10/2004 | Bimber et al. | 715/757 |
| 6,842,175 B1* | 1/2005 | Schmalstieg et al. | 345/427 |
| 6,937,255 B2* | 8/2005 | Fukuda et al. | 345/633 |
| 2002/0075286 A1* | 6/2002 | Yonezawa et al. | 345/679 |
| 2002/0095265 A1 | 7/2002 | Satoh | |
| 2003/0037449 A1* | 2/2003 | Bani-Hashemi et al. | 33/286 |
| 2003/0080978 A1* | 5/2003 | Navab et al. | 345/633 |
| 2004/0090444 A1* | 5/2004 | Satoh | 345/633 |
| 2004/0249594 A1 | 12/2004 | Satoh | |
| 2005/0174361 A1* | 8/2005 | Kobayashi et al. | 345/633 |
| 2005/0231532 A1* | 10/2005 | Suzuki et al. | 345/633 |
| 2005/0289472 A1* | 12/2005 | Morita et al. | 715/757 |
| 2006/0071946 A1* | 4/2006 | Anabuki et al. | 345/633 |

FOREIGN PATENT DOCUMENTS

JP    2003-269913 A    9/2003

OTHER PUBLICATIONS

Tuceryan, et al., "Calibration Requirement and Procedures for a Monitor-Based Augmented Reality System", IEEE Trans. Visualization & CG, vol. 1, No. 3, pp. 255-273, Sep. 1995.

* cited by examiner

*Primary Examiner*—Chante Harrison
(74) *Attorney, Agent, or Firm*—Canon U.S.A., Inc. I.P. Division

(57) ABSTRACT

An information processing method of adjusting the position/orientation of a virtual object combined with a physical object includes steps of: acquiring position information of a virtual index defined on the virtual object; informing a user of the position of the virtual index; acquiring position information of a physical index on the physical object corresponding to the virtual index based on the position information of a pointing unit operated by the user; and defining position/orientation information of the virtual object based on the position information of the virtual index and the position information of the physical index.

10 Claims, 8 Drawing Sheets

METHOD AND APPARATUS FOR PROCESSING INFORMATION

BACKGROUND OF THE INVENTION

1. Field of the Invention

The present invention relates to a technique of adjusting the position/orientation of a virtual object combined with a physical object.

2. Description of the Related Art

Many systems have been proposed which provide a natural mixture of a physical space and a virtual space based on mixed reality technology. In these mixed reality systems, an image in a virtual space drawn using a computer graphics (CG) technique is superimposed on an image in a physical space taken using an image pickup apparatus such as a camera, and the resultant mixed image is displayed on a display such as a head-mounted display (MHD) thus presenting a mixed reality image to a user.

In recent years, great advances in three-dimensional CAD (Computer Aided Design) techniques and rapid prototyping techniques have been made, and it has become possible to produce, automatically and in a short time, a mock-up of a physical object based on shape model data produced by a three-dimensional CAD system on a computer.

However, although actual mock-up models produced using a rapid prototyping shaping apparatus (hereinafter such models will be referred to as "physical models") can be similar in terms of shape to shape models produced using a three-dimensional CAD system (hereinafter, such models will be referred to as "virtual models"), materials of mock-up models are limited to those used in shaping. Therefore, all characteristics such as colors, textures, and patterns of virtual models cannot be reflected in physical models. To avoid the above problem, it is known to draw a virtual model, based on which to produce a physical model, using CG and a mixed reality system, and display the virtual model superimposed on the physical model thus allowing it to evaluate a design in terms of characteristics such as colors, textures, and patterns that cannot be evaluated when the conventional rapid prototyping technique is used.

In such a system, it is required to display a virtual model in a virtual space such that the virtual model exactly coincides with a physical model existing in a physical space. In this technique, because a physical model is produced from a virtual model produced using a three-dimensional CAD system, both models are identical in terms of the shape and the size. However, to achieve coincidence in terms of the position/orientation between both models in the mixed reality technique, it is required not only to achieve exact consistency between the physical space and the virtual space, but it is also required to place the virtual model in the virtual space and the physical model in the physical space such that the position/orientation of the physical model placed in the physical space exactly coincides with the position/orientation of the virtual model placed in the virtual space. That is, it is required to first set a coordinate system for the physical space and a coordinate system for the virtual space such that they exactly coincide with each other, and then to place the physical model and the virtual model such that their corresponding coordinates in the respective coordinate systems are exactly equal to each other.

To achieve the first requirement in terms of the consistency between the physical space and the virtual space, many positioning techniques have been proposed (an example may be found, for example, in U.S. Published application No. 2002095265 or Japanese Patent Laid-Open No. 2003-269913).

To achieve the second requirement, it is known to measure the position/orientation of the physical model in advance, and place the virtual model in accordance with the measured position/orientation of the physical model.

One known method of measuring the position/orientation of the physical model is to use a position/orientation measuring device, such as a magnetic sensor to measure a three-dimensional position/orientation using magnetism. Another known method is to stick a plurality of markers on a physical model, at known three-dimensional positions, and take an image of the physical model using an image pickup apparatus such as a camera. Markers are extracted from the image, and the position/orientation of the physical model is calculated from the correspondence between the coordinates of the extracted makers in the image and the three-dimensional positions/orientations of the markers.

However, sensors are generally expensive. In a case where the cost for a system is limited, it is difficult to use a sufficiently large number of sensors. This is a problem to be solved. Depending on the size of a physical model, it is difficult to attach three-dimensional position/orientation sensors, such as a magnetic sensor, to the physical model.

When a design is evaluated, it is necessary to perform the evaluation for various environmental conditions such as lighting in a physical space. However, depending on the environmental conditions, it is difficult to correctly detect the color of markers stuck on a physical model. In a case where a system is placed for exhibition in a showroom, colors and/or shapes of markers stuck on a physical model are limited to those that do not spoil the beauties of the showroom, and thus it is not necessarily possible to use desirable colors and/or shapes.

When it is difficult to directly measure the position/orientation of a physical model, it is known to define the position/orientation of a physical model and set the physical model at the defined position/orientation. However, even in this technique, an error in the position/orientation of the physical model often occurs. To minimize the error, after the physical model is set at the defined position/orientation, the position/orientation of a virtual model is manually adjusted in a trial-and-error fashion until the position/orientation of the physical model becomes consistent with the position/orientation of the virtual model.

In a common mixed reality system, an image in a virtual space is displayed such that it is superimposed on an image in a physical space. Therefore, for a user of the system, a virtual model is viewed in front of a physical model, and it is difficult for the user to recognize the correct relative positions of the physical model and the virtual model. This problem is serious, in particular, when the fine adjustment is made on the position/orientation of the virtual model, because, in the fine adjustment, it is necessary to detect the exact position/orientation for both the physical model and the virtual model.

SUMMARY OF THE INVENTION

The present invention provides a technique of easily adjusting the position/orientation of a virtual model such that the position/orientation of the virtual model exactly coincides with the position/orientation of a physical model.

More specifically, the present invention provides an information processing method of adjusting the position/orientation of a virtual object combined with a physical object, including steps of: acquiring position information of a virtual index defined on the virtual object; informing a user of the position of the virtual index; acquiring position information of a physical index on the physical object corresponding to the virtual index based on the position information of a pointing unit operated by the user; and defining the position/orientation information of the virtual object based on the position information of the virtual index and the position information of the physical index.

The present invention also provides an information processing apparatus for adjusting a position/orientation of a virtual object combined with a physical object, including: a virtual index position information acquisition unit adapted to acquire position information of a virtual index defined on the virtual object; an informing unit adapted to inform a user of the position information of the virtual index; a physical index position information acquisition unit adapted to acquire position information of a physical index on the physical object corresponding to the virtual index based on position information of a pointing unit operated by the user; and a definition unit adapted to define position/orientation information of the virtual object based on the position information of the virtual index and the position information of the physical index.

Other features of the present invention will be apparent from the following description taken in conjunction with the accompanying drawings, in which like reference characters designate the same or similar parts throughout the figures thereof.

DESCRIPTION OF THE EMBODIMENTS

Exemplary embodiments of the present invention will now be described in detail in accordance with the accompanying drawings.

First Embodiment

Figure 1:
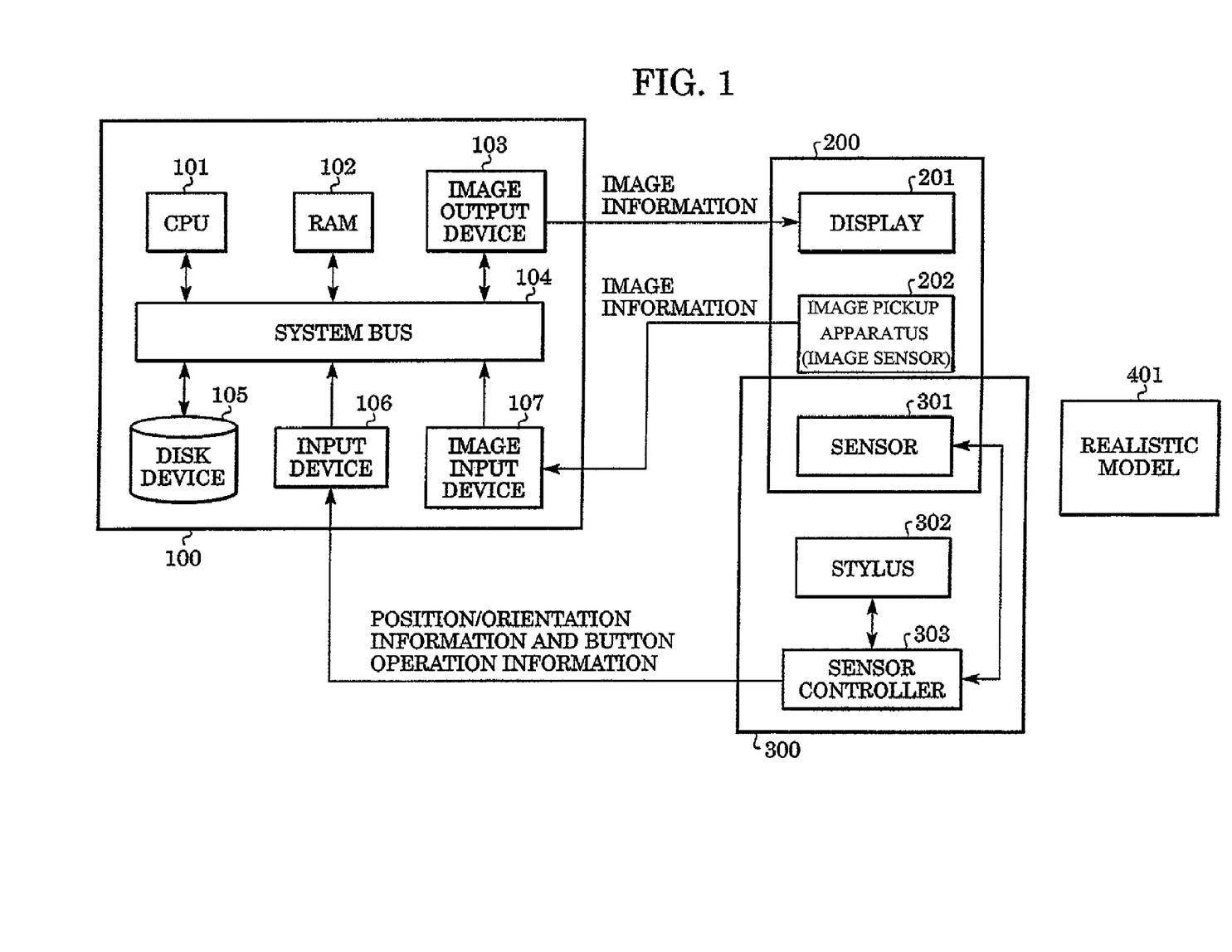
FIG. 1 is a block diagram showing an image processing apparatus.

FIG. 1 is a block diagram showing main parts of a system according to a first embodiment of the present invention.

In FIG. 1, a calculation unit 100 is realized by a computer or the like including a CPU (central processing unit) 101, a RAM (random access memory) 102, an image output device 103, a system bus 104, a disk device 105, an input device 106, and an image input device 107.

The CPU 101 controls image processing in accordance with an image processing program. The CPU 101 is connected to the system bus 104 such that the CPU 101 can communicate with the RAM 102, the image output device 103, the disk device 105, the input device 106, and the image input device 107.

The RAM 102 is a main storage device realized by memory or the like. The RAM 102 stores, via the system bus 104, program code of the image processing program and associated program control information. The RAM 102 is also used to temporarily store various kinds of data, such as real-image data input via the image input device 107, virtual space data such as CG model data and layout information, values output from sensors, and sensor calibration data. The RAM 102 includes a video buffer (not shown) for storing image data. The virtual space data includes CG models of the virtual model 402 and the virtual index 403, and position/orientation information of the virtual model 402 and the virtual index 403 placed in the virtual space. The details of the virtual model 402 and the virtual index 403 will be described later with reference to FIGS. 4 and 5. The virtual model is also referred to as a virtual object herein.

The image output device 103 is realized by a graphics card or the like. In general, the image output device 103 includes a graphics memory (not shown). Image information produced by executing a program on the CPU 101 is written in the graphics memory of the image output device 103 via the system bus 104. The image output device 103 converts the image information stored in the graphics memory into an image signal in a proper form and sends it to a display 201. The image output device 103 does not necessarily need to have the graphics memory, but the RAM 102 may also be used as the graphics memory.

In the calculation unit 100, various parts/units are connected to the system bus 104 such that they can communicate with each other via the system bus 104.

The disk device 105 is a hard disk device or the like serving as an auxiliary storage device for storing the program code of the image processing program, associated program control information, virtual space data, sensor calibration data, etc.

The input device 106 includes various interface devices for inputting signals/data from devices located outside the calculation unit 100. The input signals/data are stored in the RAM 102 via the system bus 104. The input device 106 also includes a keyboard, a mouse and/or a similar device used by a user to input a command or data.

The image input device 107 is realized by a capture card or the like for capturing a real image output from an image pickup apparatus 202. The captured real image data is stored in the RAM 102 via the system bus 104. In a case in which a display of the optical see-through type is used as the display 201, the image input device 107 is not necessarily needed.

A head-mounted unit 200 is a device such as an HMD (head-mounted display) of the video see-through type, which is mounted on the head of a user to experience the image processing apparatus according to the present embodiment of the invention. The head-mounted unit 200 includes a display 201, an image pickup apparatus (image sensor) 202, and a sensor 301. Although in the present embodiment, the head-mounted unit 200 is mounted on the head of a user, the head-mounted unit 200 does not necessarily need to be mounted on the head of a user, if the user can experience mixed reality.

The display 201 is one of one or more devices forming the video see-through HMD. The display 201 displays an image according to an image signal out from the image output device 103 so as to present a mixed reality image to a user. Although the display 201 is disposed in the head-mounted unit 200 that is mounted on the head of a user, the display 201 does not necessarily need to be mounted on the head of the user, but a desk-top display or a hand-held display may be used as the display 201 if the user can view the image displayed on the display 201.

The image pickup apparatus 202 is realized by one or more image pickup apparatus such as a CCD (charge-coupled device) camera. The image pickup apparatus 202 is used to take an actual image of a real world, as viewed from a viewpoint of a user. To this end, the image pickup apparatus 202 may be mounted on the head of a user, at a location as close to the viewpoint as possible, although there is no particular restriction on the location as long as it is possible to acquire an image as viewed from the viewpoint of the user. The optical axis of the image pickup apparatus 202 and the central axis of the display 201 may be coincident with each other using a half mirror or a prism.

The real image taken by the image pickup apparatus 202 is output as an image signal (analog signal or a digital signal according to the IEEE1394 standard) to the image input device 107. In a case in which a display of the optical see-through type is used as the display 201, the user views a real world via the display 201, and thus the image pickup apparatus 202 is not necessary.

The sensor unit 300 is realized by a 6 degree-of-freedom position/orientation detector using a magnetic sensor or the like, which detects the position/orientation of the viewpoint (sensor 301) of the user and the position/orientation of the stylus 302. The detected result is supplied to the input device 106 of the calculation unit 100. The sensor unit 300 includes the sensor 301, the stylus 302, and a sensor controller 303.

Under the control of the sensor controller 303, the sensor 301 detects the position/orientation of the viewpoint of a user and supplies the detected result to the sensor controller 303. Although there is a difference between the position at which the sensor 301 is placed and the position of the viewpoint of the user, the difference (offset) is constant because the head-mounted unit 200 is mounted on the head of the user, and thus it is possible to calculate the correct position of the viewpoint from the difference (offset) between the position of the sensor 301 and the position of the sensor 301. Therefore, in the following description, for the purpose of simplicity, it is assumed that the position/orientation of the viewpoint of a user is directly given by the position/orientation measured by the sensor 301. The sensor 301 is not only a component of the sensor unit 300 but is also a component of the head-mounted unit 200 mounted on the head of a user.

Figure 2:
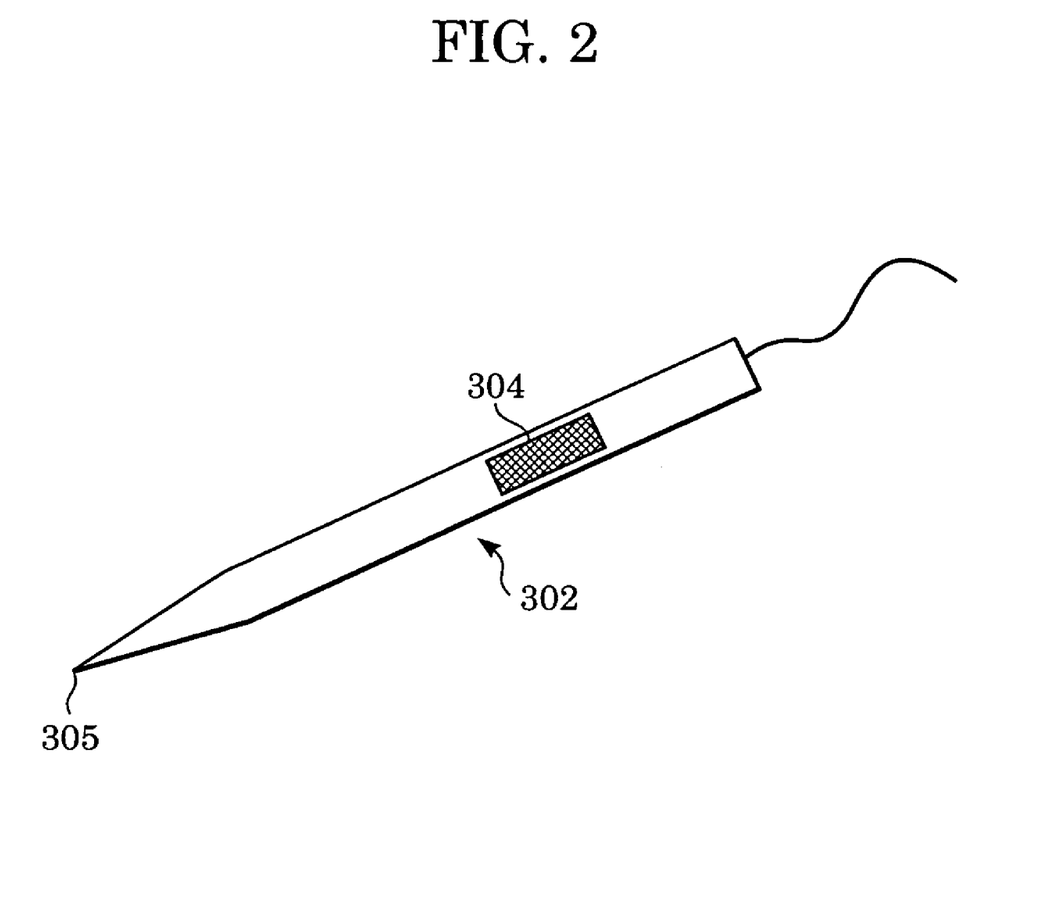
FIG. 2 is a diagram illustrating a stylus of an image processing apparatus.

The stylus 302 is a device having a pen-like shape. A user holds the stylus 302 with his/her fingers when the user uses it. The stylus 302 includes a sensor that detects the position/orientation of the stylus 302. FIG. 2 illustrates the shape and the structure of the stylus 302. Under the control of the sensor controller 303, the stylus 302 detects the position/orientation of a tip 305 of the stylus 302 and sends data indicating the detected position/orientation to the sensor controller 303.

Hereinafter, the position of the tip 305 of the stylus 302 will be referred to as the position of the stylus 302, and the direction in which the stylus 302 points will be referred to as the orientation of the stylus 302. The stylus 302 has one or more pushbutton switches 304. When the pushbutton switch 304 is pressed, a signal indicating that the pushbutton switch 304 is pressed is transmitted to the sensor controller 303.

The sensor controller 303 transmits a control command to the sensor 301 and the stylus 302, and receives position/orientation data from the sensor 301 and the stylus 302. The sensor controller 303 also receives data indicating the status of the pushbutton switches 304 from the stylus 302. The sensor controller 303 supplies data indicating the position/orientation of the sensor 301 and the stylus 302 to the input device 106. The sensor controller 303 also supplies data indicating the status of the pushbutton switches 304 to the input device 106.

The physical (realistic) model 401 refers to a physical object produced using a rapid prototyping shaping apparatus based on three-dimensional CAD data. In this specification, the physical model is also referred to as the physical object.

The image processing apparatus according to the present embodiment includes a rapid prototyping apparatus and a three-dimensional CAD system, although they are not shown in the figures.

Figure 3:
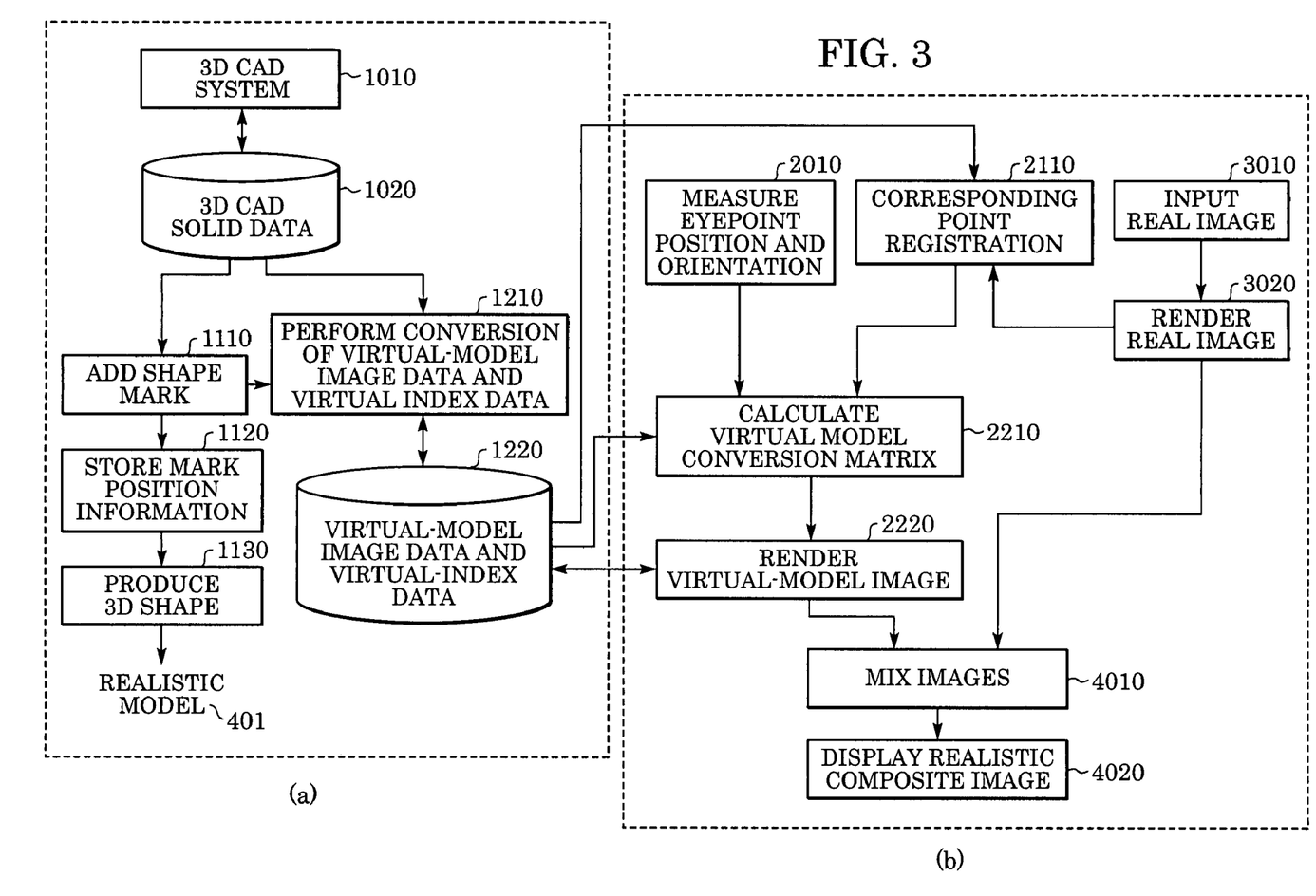
FIG. 3 is a flow chart illustrating a process performed in an image processing apparatus.

A manner in which the image processing apparatus constructed in the above-described manner is controlled according to the present embodiment is described below. FIG. 3 shows a flow of the process performed in the image processing apparatus according to the present embodiment. Program code implementing the process shown in FIG. 3 is stored in a storage device such as the disk device 105 or the RAM 102, and the program code is read and executed by the CPU 101.

A process of producing a physical model 401 and virtual model/virtual index rendering data 1220 from three-dimensional CAD data is described with reference to FIG. 3(a). The process shown in FIG. 3(a) may be performed beforehand in preparation for the process shown in FIG. 3(b). The process may be performed by the image processing apparatus configured as shown in FIG. 1 according to the present embodiment, or may be by an apparatus configured in a different manner.

When a user performs a design task using a three-dimensional CAD system (1010), shape data is usually stored as solid data (1020) peculiar to the three-dimensional CAD system (1010). In the present embodiment, first, shape data of markers are added to the surface of the three-dimensional CAD solid data 1020 using the three-dimensional CAD system 1010 (step 1110), and position information thereof is stored (step 1120). The details of the markers will be described later with reference to FIGS. 4 and 5.

Using the three-dimensional CAD system 1010, a plurality of shape data representing markers are added to the three-dimensional CAD solid data 1020. When the shape data are added to the solid data 1020, integral values starting from 1 are uniquely assigned as ID (identification) numbers to the respective shape data. Marks represented by the shape data may be in the form of small holes (or key holes or grooves) in which the tip of the stylus 302 can be fit. The shape data of the marks may be added by using a plug-in function of the three-dimensional CAD system 1010 or may be added as usual CAD object data using the three-dimensional CAD system, as long as the marks can be formed on the surface of the physical model 401.

Using the rapid prototyping apparatus, a physical model 401 is produced from the three-dimensional CAD solid data 1020 (step 1130). As a result, the physical model 401 has a plurality of marks in the form of small holes or the like (in which the tip of the stylus 302 can be fit) added to the surface thereof. An ID number (one of integral values starting from 1 assigned to the respective shape data) assigned to each hole may be described in the vicinity of the hole such that a user can easily identify each hole.

The three-dimensional CAD solid data 1020 is represented by a set of geometric parameters of each design part, and a CG display system is generally incapable of drawing the virtual model 402 directly from the three-dimensional CAD solid data 1020. Therefore, the three-dimensional CAD solid data 1020 is converted into a data format (for example, the VRML format) which can be dealt with by common CG display systems (step 1210). Similarly, the marker data added in step 1110 is converted into the data format (for example, the VRML format) such that the markers can be drawn as the virtual indices 403 at the locations specified by the marker shape data by the common CG display system (step 1210).

Each converted virtual index 403 includes an ID number assigned to corresponding marker shaped data. In the present embodiment, the virtual model 402 and the virtual indices 403 are drawn in the virtual space using the virtual model/virtual index rendering data 1220 obtained via the above-described conversion process.

At this stage of the process, the position/orientation of the virtual model 402 in the virtual space is tentatively defined and data indicating the position/orientation is stored together with the virtual model data in the virtual model/virtual index rendering data 1220. Since the virtual indices 403 are located on the surface of the virtual model 402, the position of each virtual index 403 is uniquely determined if the position/orientation of the virtual model 402 is determined. The position of each virtual index 403 is also described in the virtual mode/virtual index rendering data 1220.

A process of outputting a mixed reality image is described next with reference to FIG. 3(b).

The position/orientation of the viewpoint of a user is detected using the sensor 301 and the sensor controller 303, which are components of the head-mounted unit 200 (step 2010). The resultant position/orientation information is acquired by the calculation unit 100 via the input device 106.

A corresponding point registration process (step 2110) is described in detail with reference to FIGS. 4 and 5. In the corresponding point registration process, positions of points on the physical model corresponding to points on the virtual model are measured, and the measured position and the order in which points were measured are registered.

Step S2110 is started when a corresponding point registration start command is issued by a user by operating a keyboard, a mouse, or a stylus button. All virtual indices 403 are respectively assigned ID numbers having integral values starting from 1. At the start of the corresponding point registration process, a parameter k indicating the virtual index ID number is reset to 1 (step S2111).

Figure 5A:
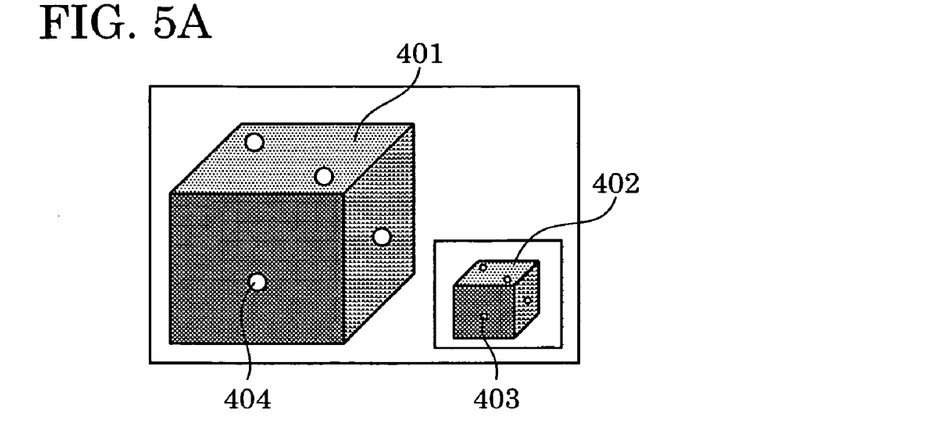
FIGS. 5A to 5C are diagrams showing a manner in which corresponding points are registered.

When the corresponding point registration process is started, as shown in FIG. 5A, a read image captured by the image pickup apparatus 202 and virtual indices 403 of the virtual model 402 are displayed on the screen of the display 201 (step S2112). Although In FIGS. 5A to 5C, a window is produced in the real image, and the image of the virtual model 402 drawn for a properly set position of the viewpoint and direction of the line of sight is displayed together with virtual indices 403 in the window, the virtual model 402 and the virtual indices 403 may be directly superimposed on the real image.

In the case in which the virtual model 402 and the virtual indices 403 are directly superimposed on the real image, the virtual model 402 and the virtual indices 403 may be displayed in a translucent fashion or in a wireframe representation such that the real image is not completely hidden by the virtual model 402. Conversely, the real image may be superimposed on the image of the virtual model 402. In the example shown in FIG. 5, the image pickup apparatus 202 (that is, the head-mounted unit 200) is placed so that the physical model 401 is included in the real image.

Figure 5B:
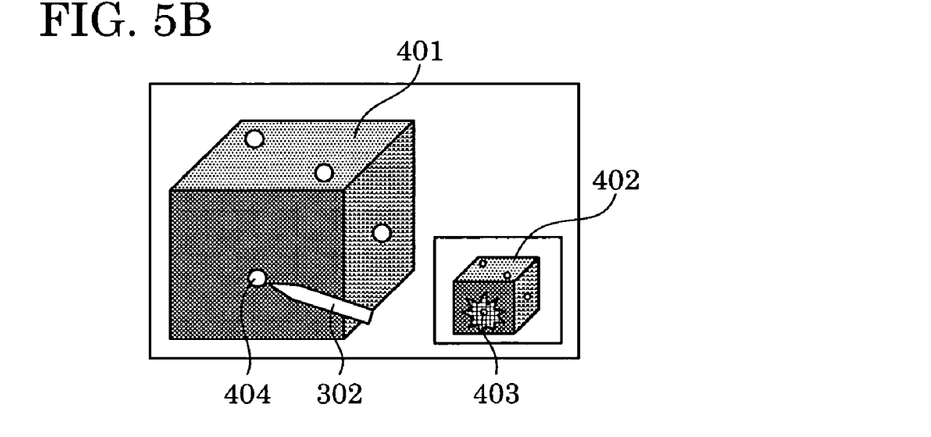

In step S2113, a virtual index 403 having a k-th ID number is highlighted (for example, displayed in a blinking fashion) so that it can be easily distinguished from other virtual indices, as shown in FIG. 5B. By displaying one of virtual indices in the highlighted fashion, a user is prompted to place the tip of the stylus 302 on the real model, at a position corresponding to the virtual index, press the pushbutton switch 304.

To more explicitly prompt the user to do so, a message "Place the tip of the stylus on the physical model, at the position corresponding to the blinking virtual index and press the switch" may be displayed on the screen of the display 201, or the message may be given in the form of an audio message. In step S2113, instead of highlighting one of the virtual indices, one of virtual indices may be displayed and the other virtual indices may be hidden.

If the user presses the pushbutton switch 304 (that is, the answer to step S2114 is yes), the position of the stylus tip 305 is measured, and the measured position of the virtual index is stored together with its ID number "k" in the RAM 102 or on the disk device 105 (step S2115). Because the ID numbers are assigned integral values starting from 1, "k" can be regarded as the measurement order. Instead of detecting the pressing of the pushbutton switch 304, placing of the tip 305 on the surface of the physical model 401 may be detected by a pressure sensor disposed on the tip 305.

Because the virtual model 402 and the physical model 401 are produced from the same data, and because the virtual indices 403 and the holes 404 on the physical model are produced from the same data, the physical model has holes 404 located at positions corresponding to the positions of the respective virtual indices 403. Therefore, the position of each corresponding point can be accurately measured by fitting the tip 305 of the stylus in the hole on the physical model at the position corresponding to the position of each virtual index 403.

In step S2116, it is determined whether the pushbutton switch 304 has been pressed n times. That is, it is determined whether n=k where n denotes the number of corresponding points that are needed to achieve coincidence between the position/orientation of the virtual model and the position/orientation of the physical model. In general, it is possible to achieve coincidence between the position/orientation of the virtual model and the position/orientation of the physical model, by measuring four or more points if all corresponding indices do not lie in the same plane, or by measuring three or more points if the measurement order is taken into account or if the distance from the viewpoint to the virtual indices is taken into account.

If it is determined that the pushbutton switch 304 has been pressed n times, the process proceeds to step 2210 in FIG. 3. However, if it is determined that the pushbutton switch 304 has not been pressed n times, the process proceeds to step S2117. In step S2117, k is incremented by 1, and the process returns to step S2112 to repeatedly perform the above-described process until the pushbutton has been pressed n times.

In step 2210, a virtual model conversion matrix for drawing the virtual model so as to coincide with the physical model is calculated based on the viewpoint position/orientation information obtained in step 2010, the stylus position information (and ID numbers of virtual indices) obtained in step S2110, and the virtual index position information described in the data 1220. The virtual model conversion matrix is determined such that each position of the stylus tip 305 measured in step 2110 becomes coincident with the position of the corresponding virtual index.

If the coordinates of the k-th virtual index on the virtual model 402 are denoted by $p_k$ (where k is the ID number of the virtual index), then the coordinates $p_k$ is given as $p_k=(X_k, Y_k, Z_k, 1)^T$. The coordinates of the position measured in step 2110 for a hole on the physical model 401, corresponding to $p_k$, are given as $q_k=(x_k, y_k, z_k, 1)^T$. A matrix obtained by arranging as many $p_k$ as there are n points is denoted as $P=(p_1 p_2 \ldots p_n)$ where $n \geq 4$ (or $n \geq 3$). Similarly, a matrix Q is defined as $Q=(q_1 q_2 \ldots q_n)$. Herein, the relationship between P and Q is expressed as Q=MP, where M is a 4×4 virtual model conversion matrix that converts a point $p_k$ to a point $q_k$. By applying the virtual model conversion matrix M to the virtual model 402 whose position/orientation is tentatively set at the beginning of the process, it is possible to convert the position/orientation of the virtual model 402 to the position/orientation coincident with the position/orientation of the physical model 401. The matrix M can be determined according to the following equation.

$$M = Q(P^T P)^{-1} P^T$$

where $(P^T P)^{-1} P^T$ is the pseudo inverse matrix of P.

Concurrently with steps 2010, 2110, and 2210, the image of the physical space is input to the calculation unit 100 via the image input device 107, using the image pickup apparatus 202 which is a component of the head-mounted unit 200 (step 3010). The image data of the physical space acquired in step 3010 is rendered in a memory such as a video buffer (step 3020).

In step 2220, based on the virtual model conversion matrix M calculated in step 2210 and the virtual model data described in the virtual model/virtual index rendering data 1220, the image of the virtual model to be superimposed on the physical model is rendered in the memory such as the video buffer.

The image of the virtual model may be displayed such that a background is transparent except for an area occupied by the virtual model. The image data of the physical space captured in step 3010 is also rendered in the memory such as the video buffer (step 3020), and the virtual model image rendered in the step 2220 is superimposed on the real image (step 4010). The resultant composite image is converted by the image output device 103 into an analog video signal or a digital video signal and displayed on the display 201 which is a component of the head-mounted unit 200 (step 4020).

The process from step 2010 to step 4020 (shown in FIG. 3(b)) is performed repeatedly at intervals equal to the intervals at which the image displayed on the display 201 is updated or equal to the updating intervals in the virtual model rendering process (step 2220), so as to display information in real time.

Although in the present embodiment, the position/orientation is measured using magnetism, the position/orientation measuring device is not limited to such a type, but other types of measuring devices such as an optical position/orientation measuring device, a mechanical position/orientation measuring device, or a surveying device may also be used.

According to the first embodiment of the present invention, as described above, when a physical model and a virtual model which are identical to each other in terms of the shape and the size, it is possible to easily adjust the position/orientation of the virtual model such that the position/orientation of the virtual model exactly coincides with the position/orientation of the physical model.

Second Embodiment

An image processing apparatus according to a second embodiment is similar in terms of configuration to the first embodiment described above with reference to FIGS. 1 and 2.

A process performed by the image processing apparatus according to the present embodiment is described below with reference to FIGS. 3 to 5.

In step 2210 in FIG. 3, a virtual model conversion matrix M for drawing the virtual model so as to coincide with the physical model is calculated based on the viewpoint position/orientation information obtained in step 2010, the stylus position information (and ID numbers of virtual indices) obtained in step S2110, and the virtual index position information described in the data 1220. However, if it is impossible to uniquely determine the virtual model conversion matrix M, an error message may be displayed on the screen of the display 201. The message may be given in the form of an audio message.

Such an error can occur if, in the corresponding point registration process in step 2110, the virtual indices 403 on the virtual model 402 do not exactly correspond to holes on the physical model 401. That is, in steps S2113 to S2114 in FIG. 4, if the position of the stylus tip 305 is measured when the stylus tip 305 is located at a position shifted from a correct position corresponding to a virtual index, an error can occur.

If an error occurs in step 2210, the process returns to step 2110 to again perform the corresponding point registration process.

Figure 4:
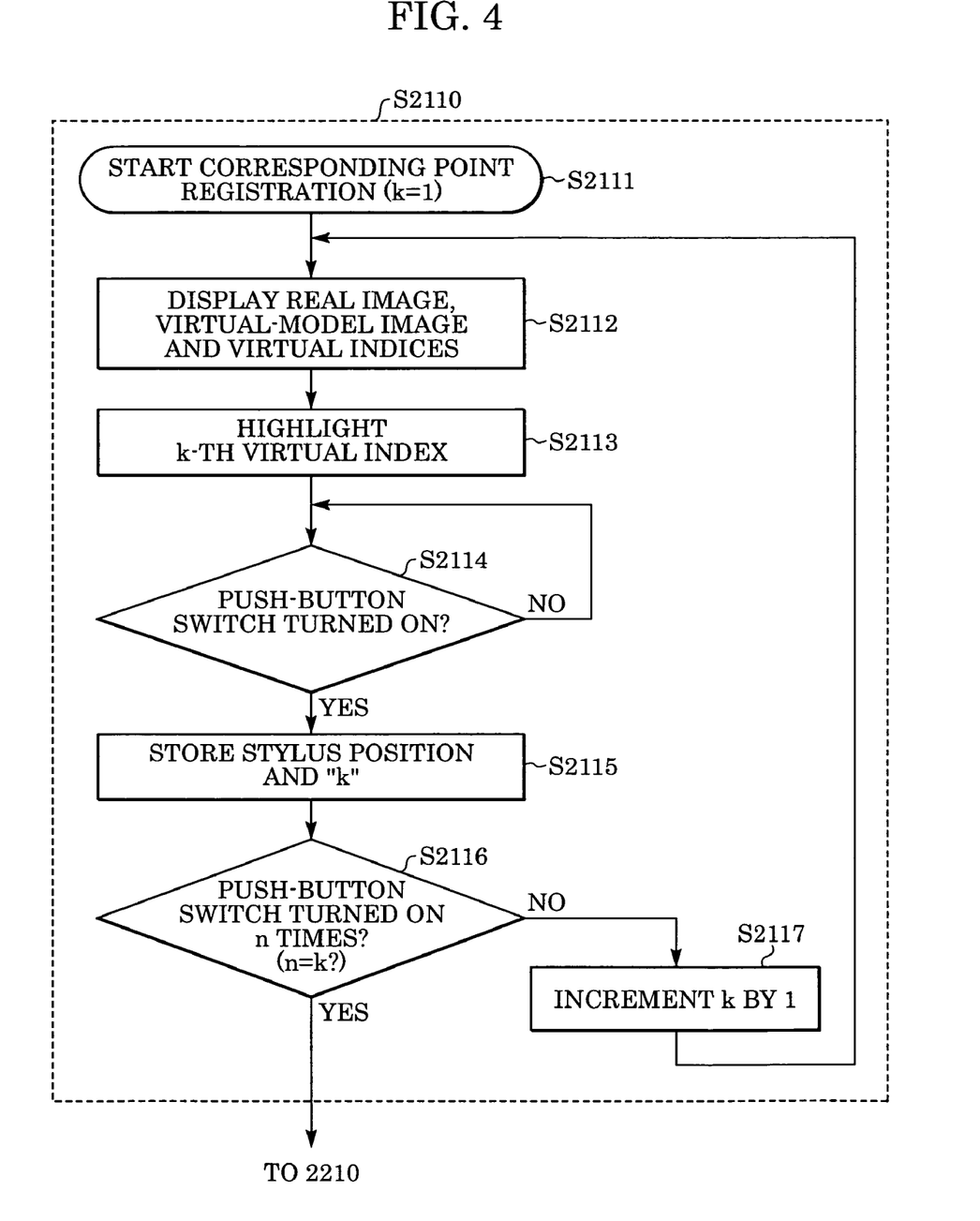
FIG. 4 is a flow chart illustrating a step of a process performed in an image processing apparatus.
Figure 5C:
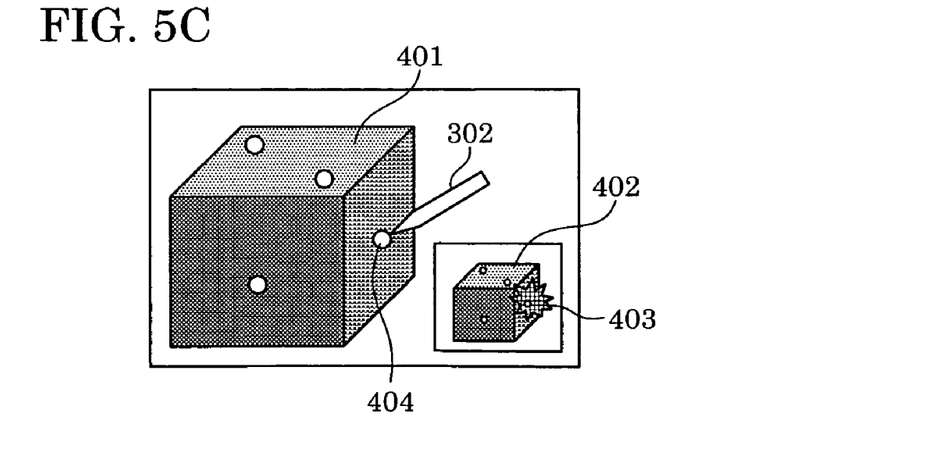

In FIGS. 3 to 5, the other steps and parts are similar to those in the first embodiment.

According to the second embodiment of the present invention, as described above, when a physical model and a virtual model which are identical to each other in terms of the shape and the size, it is possible to easily adjust the position/orientation of the virtual model such that the position/orientation of the virtual model exactly coincides with the position/orientation of the physical model. When an error occurs because it is impossible to uniquely determine the virtual model conversion matrix, the corresponding point registration process is performed again.

Third Embodiment

An image processing apparatus according to a third embodiment is similar in terms of configuration to the first embodiment described above with reference to FIGS. 1 and 2.

A process performed by the image processing apparatus according to the present embodiment is described below with reference to FIGS. 3 to 5.

In step 2210 in FIG. 3, a virtual model conversion matrix M for drawing the virtual model so as to coincide with the physical model is calculated based on the viewpoint position/orientation information obtained in step 2010, the stylus position information (and ID numbers of virtual indices) obtained in step S2110, and the virtual index position information described in the data 1220. The virtual model conversion matrix M is determined such that each position of the stylus tip 305 measured in step 2110 becomes coincident with the position of the corresponding virtual index.

In the first embodiment, in step 2110, n=3 or 4, that is, three or four corresponding points are used to achieve the coincidence between the position/orientation of the virtual model and that of the physical model. However, this is premised on the exact correspondence between the virtual indices on the virtual model and the respective holes on the physical model. In practice, when the physical model is produced using a rapid prototyping apparatus, there is a possibility that some error can occur in the position of the hole.

To avoid the problem described above, five or more corresponding points may be selected for use in adjustment of the position/orientation of the virtual model with respect to the position/orientation of the physical model, and conversion parameters may be determined by an iterative numerical calculation according to an ICP (Iterative Closest Point) algorithm or the like.

The ICP algorithm refers to an algorithm to determine conversion parameters without information associated with correspondence given in advance. In this algorithm, coincidence between the position/orientation of the virtual model and the position/orientation of the physical model is achieved as follows. First, correspondence is tentatively defined by assuming that each virtual index on the virtual model corresponds to a closest hole on the physical model, and conversion parameters are determined based on the assumed correspondence.

Next, the virtual model is converted using the conversion parameters, and correspondence is redefined on the assumption that each virtual index on the converted virtual model corresponds to a closest hole on the physical model. Conversion parameters are determined again based on the redefined correspondence. The above process is performed repeatedly until good coincidence between the position/orientation of the virtual model and the position/orientation of the physical model is obtained. The iterative numerical calculation method based on the ICP algorithm or the like is useful in particular when there is some error in the position of a physical index corresponding to a virtual model due to insufficient accuracy of the rapid prototyping apparatus.

In FIGS. 3 to 5, the other steps and parts are similar to those in the first embodiment.

According to the third embodiment of the present invention, as described above, when a physical model and a virtual model which are identical to each other in terms of the shape and the size, it is possible to easily adjust the position/orientation of the virtual model such that the position/orientation of the virtual model exactly coincides with the position/orientation of the physical model. The present embodiment is useful in particular when there is some error in the position of a physical index corresponding to a virtual model due to insufficient accuracy of the rapid prototyping apparatus.

Fourth Embodiment

An image processing apparatus according to a fourth embodiment is similar in terms of configuration to the first embodiment described above with reference to FIGS. 1 and 2. However, a physical model 401' is used instead of the physical model 401, a virtual model 402' is used instead of the physical model 402, and virtual indices 403' are used instead of virtual indices 403.

Figure 6:
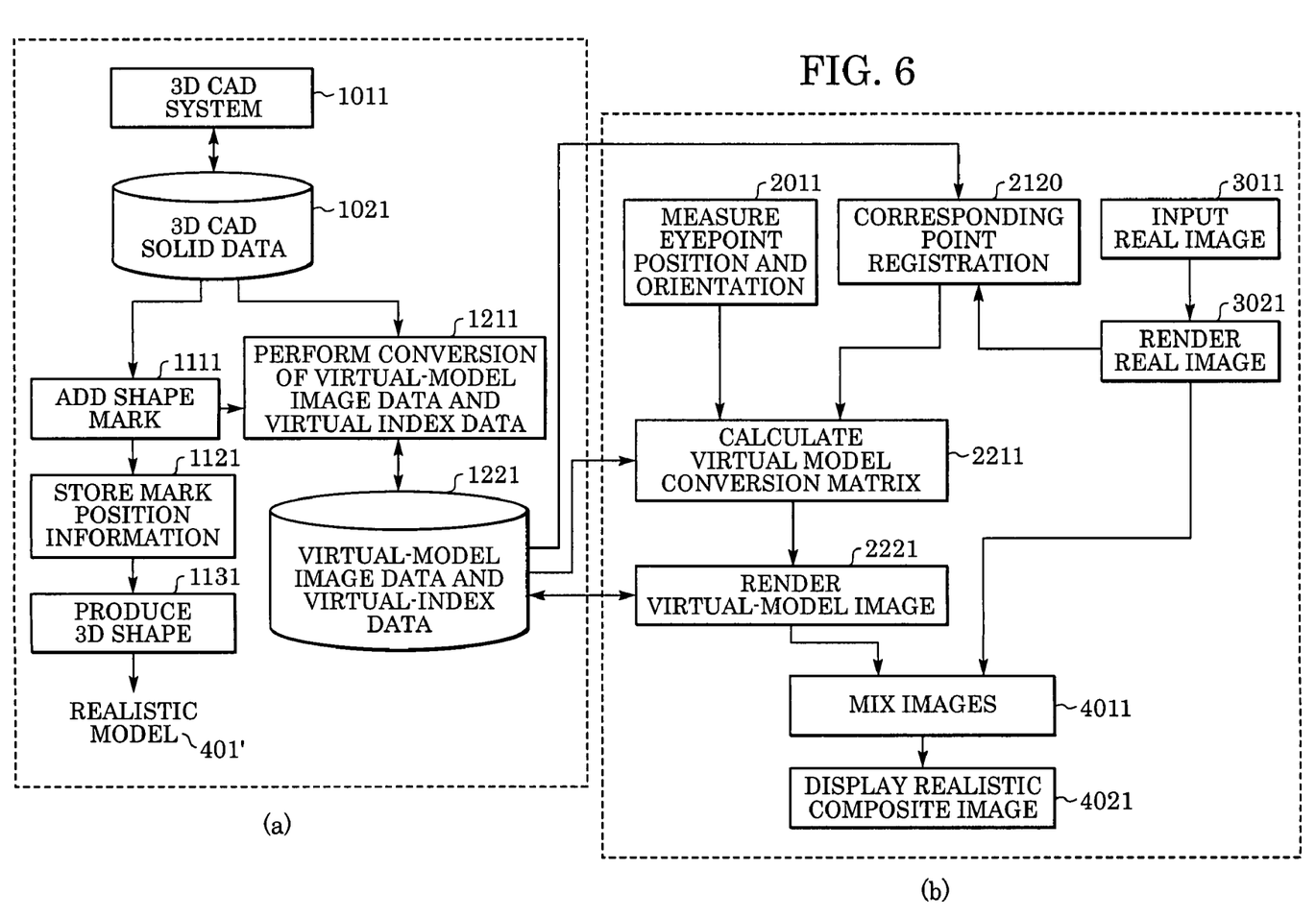
FIG. 6 is a flow chart illustrating a process performed in an image processing apparatus according to an embodiment of the invention.

A process performed by the image processing apparatus according to the present embodiment is described below with reference to FIGS. 6 to 8. FIG. 6 illustrates a flow of a process performed in the image processing apparatus according to the present embodiment. Program code implementing the process shown in FIG. 6 is stored in a storage device such as the disk device 105 or the RAM 102, and the program code is read and executed by the CPU 101.

A process of producing a physical model 401' and a virtual model/virtual index rendering data 1221 from a three-dimensional CAD data is described with reference to FIG. 6(a). The process shown in FIG. 6(a) may be performed beforehand in preparation for the process shown in FIG. 6(b). The process may be performed by the image processing apparatus configured as shown in FIG. 1 according to the present embodiment, or may be by an apparatus configured in a different manner.

When a user performs a design task using a three-dimensional CAD system (1011), shape data is usually stored as solid data (1021) peculiar to the three-dimensional CAD system. In the present embodiment, first, shape data of markers are added to the surface of the three-dimensional CAD solid data 1021 using the three-dimensional CAD system 1011 (step 1111), and position information thereof is stored (step 1121). The details of the markers will be described later with reference to FIGS. 7 and 8. Using the three-dimensional CAD system 1011, a plurality of shape data representing markers are added to the three-dimensional CAD solid data 1021. When the shape data are added to the solid data 1021, integral values starting from 1 are uniquely assigned as ID (identification) numbers to the respective shape data. Shape data of markers may be added to the three-dimensional CAD solid data 1021 such that the physical model 401' produced based on the three-dimensional CAD solid data 1021 has markers located at positions, such as protruding or recessed positions, which allow a user to easily touch the tip of the stylus 302 to the markers. In the process of adding shape data of markers, such positions may be manually specified by a user or such positions may be automatically detected from the three-dimensional CAD solid data 1021 using a proper algorithm. The shape data of the marks may be added by using a plug-in function of the 3-dimensional CAD system 1011 or may be added as usual CAD object data using the 3-dimensional CAD system 1011. Using the rapid prototyping apparatus, a physical model 401' is produced from the three-dimensional CAD solid data 1021 (step 1131). In the present embodiment, the shape data of markers is managed separately from the three-dimensional CAD solid data 1021, and no markers are formed on the physical model 401' at the stage where the physical model 401' is produced based on the three-dimensional CAD solid data 1021. That is, in the present embodiment, unlike the first to third embodiments, the physical model is produced from the three-dimensional CAD solid data 1021 including no shape data of markers such as small holes.

The three-dimensional CAD solid data 1021 is represented by a set of geometric parameters of each design part, and a CG display system is generally incapable of drawing the virtual model 402' directly from the three-dimensional CAD solid data 1021. Therefore, the three-dimensional CAD solid data 1021 is converted into a data format (for example, the VRML format) which can be dealt with by common CG display systems (step 1211). Similarly, the marker data added in step 1111 is converted into the data format (for example, the VRML format) such that the markers can be drawn as the virtual indices 403' at the locations specified by the marker shape data by the common CG display system (step 1211). Each converted virtual index 403' includes an ID number assigned to corresponding marker shaped data. In the present embodiment, the virtual model 402' and the virtual indices 403' are drawn in the virtual space using the virtual model/virtual index rendering data 1221 obtained via the above-described conversion process. At this stage of the process, the position/orientation of the virtual model 402' in the virtual space is tentatively defined and data indicating the position/orientation is stored together with the virtual model data in the virtual model/virtual index rendering data 1221. Since the virtual indices 403' are located on the surface of the virtual model 402', the position of each virtual index 403' is uniquely determined if the position/orientation of the virtual model 402' is determined. The position of each virtual index 403' is also described in the virtual mode/virtual index rendering data 1221.

A process of outputting a mixed reality image is described next with reference to FIG. 6(b).

The position/orientation of the viewpoint of a user is detected using the sensor 301 and the sensor controller 303, which are components of the head-mounted unit 200 (step 2011). The resultant position/orientation information is acquired by the calculation unit 100 via the input device 106.

A corresponding point registration process (step 2120) is described in detail with reference to FIGS. 7 and 8. In the corresponding point registration process, positions of points on the physical model corresponding to points on the virtual model are measured, and the measured position and the order in which points were measured are registered.

Step S2120 is started when a corresponding point registration start command is issued by a user by operating a keyboard, a mouse, or a stylus button. All virtual indices 403' are respectively assigned ID numbers having integral values starting from 1. At the start of the corresponding point registration process, a parameter k indicating the virtual index ID number is reset to 1 (step S2121). When the corresponding point registration process is started, as shown in FIG. 8A, a read image captured by the image pickup apparatus 202 and virtual indices 403' of the virtual model 402' are displayed on the screen of the display 201 (step S2122). Although in the example shown in FIGS. 8A to 8C, a window is produced in the real image, and the image of the virtual model 402' drawn for a properly set position of the viewpoint and direction of the line of sight is displayed together with virtual indices 403' in the window, the virtual model 402' and the virtual indices 403' may be directly superimposed on the real image. In the case in which the virtual model 402' and the virtual indices 403' are directly superimposed on the real image, the virtual model 402' and the virtual indices 403' may be displayed in a translucent fashion or in a wireframe representation such that the real image is not completely hidden by the virtual model 402'. Conversely, the real image may be superimposed on the image of the virtual model 402'. In the example shown in FIGS. 8A to 8C, the image pickup apparatus 202 (that is, the head-mounted unit 200) is placed so that the physical model 401' is included in the real image.

Figure 8A:
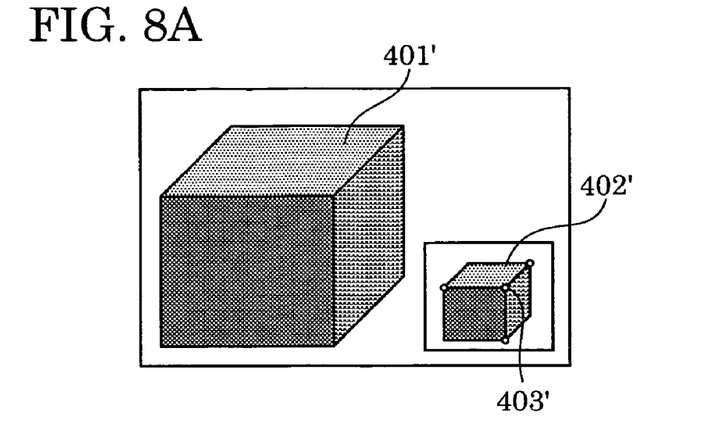
FIGS. 8A to 8C are diagrams showing a manner in which corresponding points are registered according to an embodiment of the present invention.
Figure 8B:
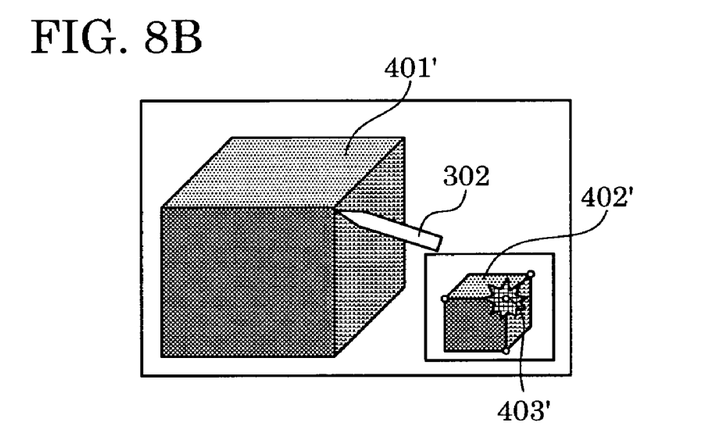

In step 2123, a virtual index 403' having a k-th ID number is highlighted (for example, displayed in a blinking fashion) so that it can be easily distinguished from other virtual indices, as shown in FIG. 8B. By displaying one of virtual indices in the highlighted fashion, a user is prompted to place the tip of the stylus 302 on the real mode, at a position corresponding to the virtual index, press the pushbutton switch 304. To more explicitly prompt the user to do so, a message "Place the tip of the stylus on the physical model, at the position corresponding to the blinking virtual index and press the switch" may be displayed on the screen of the display 201, or the message may be given in the form of an audio message. In step S2123, instead of highlighting one of the virtual indices, one of virtual indices may be displayed and the other virtual indices may be hidden. If the user presses the pushbutton switch 304 (that is, the answer to step S2124 is yes), the position of the stylus tip 305 is measured, and the measured position of the virtual index is stored together with its ID number "k" in the RAM 102 or on the disk device 105 (step S2125). Because the ID numbers are assigned integral values starting from 1, "k" can be regarded as the measurement order. Instead of detecting the pressing of the pushbutton switch 304, placing of the tip 305 on the surface of the physical model 401' may be detected by a pressure sensor disposed on the tip 305. The virtual model 402' and the physical model 401' are produced from the same data, and the virtual indices 403' are placed on the virtual model 402' such that corresponding markers on the physical model are located at positions, such as protruding or recessed positions, which allow a user to easily touch the tip of the stylus 302 to the markers. This makes it possible to accurately measure the positions of corresponding points.

In step S2126, it is determined whether the pushbutton switch 304 has been pressed n times. That is, it is determined whether n=k where n denotes the number of corresponding points that are needed to achieve coincidence between the position/orientation of the virtual model and the position/orientation of the physical model. In general, it is possible to achieve coincidence between the position/orientation of the virtual model and the position/orientation of the physical model, by measuring four or more points if all corresponding indices do not lie in the same plane, or by measuring three or more points if the measurement order is taken into account or if the distance from the viewpoint to the virtual indices is taken into account. If it is determined that the pushbutton switch 304 has been pressed n times, the process proceeds to step 2211 in FIG. 6. However, if it is determined that the pushbutton switch 304 has not been pressed n times, the process proceeds to step S2127. In step S2127, k is incremented by 1, and the process returns to step S2122 to repeatedly perform the above-described process until the pushbutton has been pressed n times.

In step 2211, a virtual model conversion matrix for drawing the virtual model so as to coincide with the physical model is calculated based on the viewpoint position/orientation information obtained in step 2011, the stylus position information (and ID numbers of virtual indices) obtained in step S2120, and the virtual index position information described in the data 1221. The virtual model conversion matrix is determined such that each position of the stylus tip 305 measured in step 2120 becomes coincident with the position of the corresponding virtual index.

If the coordinates of the k-th virtual index on the virtual model 402' are denoted by $p_k$ (where k is the ID number of the virtual index), then the coordinates $p_k$ is given as $p_k=(X_k, Y_k, Z_k, 1)^T$. The coordinates of the position measured in step 2120 for a hole on the physical model 401', corresponding to $p_k$, are given as $q_k=(x_k, y_k, z_k, 1)^T$. A matrix obtained by arranging as many $p_k$ as there are n points is denoted as $P=(p_1 p_2 \ldots p_n)$ where $n \geq 4$ (or $n \geq 3$). Similarly, a matrix Q is defined as $Q=(q_1 q_2 \ldots q_n)$. Herein, the relationship between P and Q is expressed as Q=MP, where M is a 4×4 virtual model conversion matrix that converts a point $p_k$ to a point $q_k$. By applying the virtual model conversion matrix M to the virtual model 402' whose position/orientation is tentatively set at the beginning of the process, it is possible to convert the position/orientation of the virtual model 402' to the position/orientation coincident with the position/orientation of the physical model 401'. The matrix M can be determined according to the following equation.

$$M = Q(P^T P)^{-1} P^T$$

where $(P^T P)^{-1} P^T$ is the pseudo inverse matrix of P. Concurrently with steps 2011, 2120, and 2211, the image of the physical space is input to the calculation unit 100 via the image input device 107, using the image pickup apparatus 202 which is a component of the head-mounted unit 200 (step 3011). The image data of the physical space acquired in step 3011 is rendered in a memory such as a video buffer (step 3021).

In step 2221, based on the virtual model conversion matrix M calculated in step 2211 and the virtual model data described in the virtual model/virtual index rendering data 1221, the image of the virtual model to be superimposed on the physical model is rendered in the memory such as the video buffer. The image of the virtual model may be displayed such that a background is transparent except for an area occupied by the virtual model. The image data of the physical space captured in step 3011 is also rendered in the memory such as the video buffer (step 3021), and the virtual model image rendered in the step 2221 is superimposed on the real image (step 4011). The resultant composite image is converted by the image output device 103 into an analog video signal or a digital video signal and displayed on the display 201 which is a component of the head-mounted unit 200 (step 4021).

The process from step 2011 to step 4021 (shown in FIG. 6(*b*)) is performed repeatedly at intervals equal to the intervals at which the image displayed on the display 201 is updated or equal to the updating intervals in the virtual model rendering process (step 2221), so as to display information in real time.

Although in the present embodiment, the position/orientation is measured using magnetism, the position/orientation measuring device is not limited to such a type, but other types of measuring devices such as an optical position/orientation measuring device, a mechanical position/orientation measuring device, or a surveying device may also be used.

Figure 7:
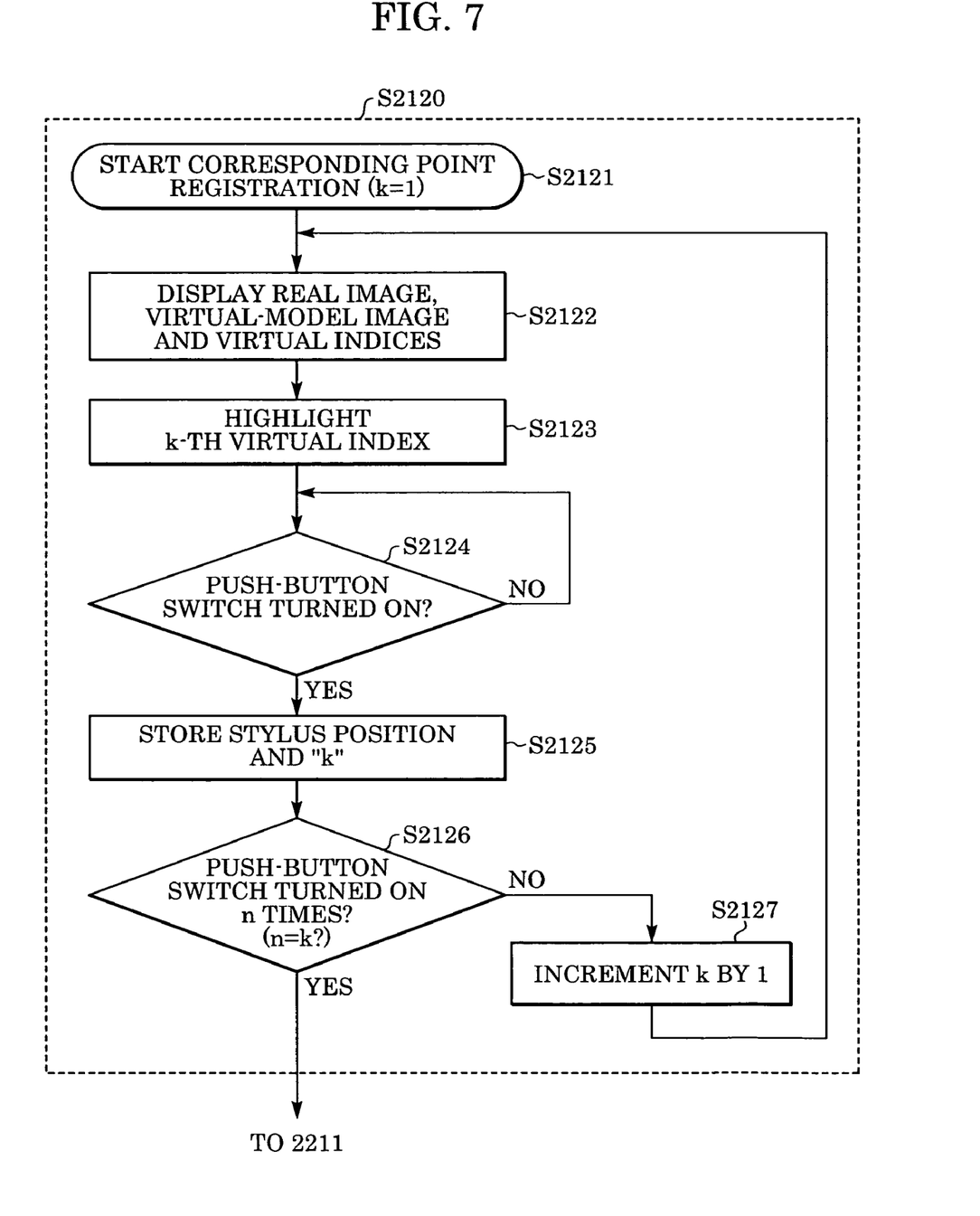
FIG. 7 is a flow chart illustrating a step of a process performed in an image processing apparatus according to an embodiment of the invention.
Figure 8C:
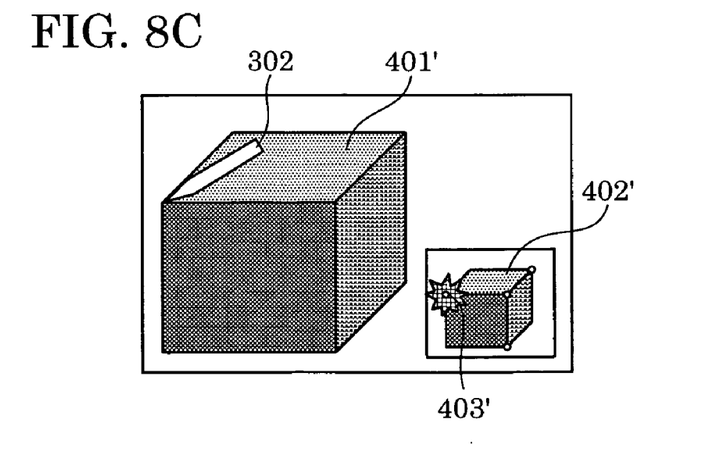

In FIGS. 6 to 8, the other steps and parts are similar to those in the first embodiment.

According to the fourth embodiment of the present invention, as described above, when a physical model and a virtual model which are identical to each other in terms of the shape and the size, it is possible to easily adjust the position/orientation of the virtual model such that the position/orientation of the virtual model exactly coincides with the position/orientation of the physical model. In the present embodiment, the shape data of markers are not reflected in the physical model, and the physical model is produced from the 3-dimensional CAD solid data including no shape data.

Other Embodiments

A storage medium having software program code stored thereon may be provided to a system or an apparatus for implementing the functions of the present invention, disclosed in the embodiments described above, and by reading and executing the program code on a computer (or a CPU or an MPU (micro-processing unit)) disposed in the system or the apparatus.

In this case, it should be understood that the software program code read from the storage medium implements the functions of embodiments.

Storage media which can be employed in the present invention to store the program code include a floppy disk, hard disk, optical disk, magneto-optical disk, CD-ROM (compact disk-read-only memory), CD-R (CD-recordable), magnetic tape, nonvolatile memory card, and ROM.

The functions disclosed in the embodiments may be implemented not only by executing the program code on a computer, but part or all of the processes may be performed by an operating system or the like running on the computer in accordance with a command issued by the program code.

Furthermore, the program code may be loaded from a storage medium into a memory provided on an expansion board inserted into the computer or an expansion unit connected to the computer, and a part or all of the process may be executed by a CPU or the like provided on the expansion board or the expansion unit thus realizing the functions according to the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-191626 filed Jun. 29, 2004 and Japanese Patent Application No. 2005-120914 filed Apr. 19, 2005, which are hereby incorporated by reference herein in their entirety.

What is claimed is:

1. An information processing method of superimposing a virtual model of a physical object onto an image of the physical object, comprising steps of:

inputting an image of the physical object with an image input device, the physical object including a plurality of marks on a surface thereof;

displaying the image of the physical object on a display device, the image of the physical object including a plurality of virtual indices representing first positions of the plurality of marks of the physical object that are used for setting a position of a virtual model of the physical object for a user;

acquiring second positions of the plurality of marks of the physical object corresponding to the plurality of virtual indices in an actual space of the physical object based on interaction of the user with the plurality of marks of the physical object, wherein at least one of the plurality of virtual indices is displayed by the displaying step in a display mode so as to prompt the interaction of the user with the plurality of marks of physical object;

correcting the first positions of the plurality of marks based on the second positions of the plurality of marks; and superimposing the virtual model on the image of the physical object based on the corrected first positions of the plurality of marks such that at least a predetermined number of marks of the physical object coincide with a corresponding predetermined number of virtual indices.

2. An information processing method according to claim 1, wherein the predetermined number of marks of the physical object that coincide with the corresponding predetermined number of virtual indices is at least three.

3. An information processing method according to claim 1, wherein acquiring the second positions of the plurality of marks of the physical object comprises placing a pointing device on each of the plurality of marks of the physical object; and superimposing the virtual model comprises superimposing the virtual model on the image of the physical object based on the corrected first positions of the plurality of marks.

4. The information processing method according to claim 1, further comprising a step of:

displaying, with the image of the physical object, the virtual model and the plurality of virtual indices in a window.

5. The information processing method according to claim 1, wherein the plurality of marks of the physical object includes a plurality of holes or grooves, and wherein acquiring the second positions of the plurality of marks of the physical object includes placing a pointing device on a predetermined number of the holes or grooves of the physical object.

6. An information processing apparatus for superimposing a virtual model of a physical object on an image of the physical object, the information processing apparatus comprising:

an image input device for inputting an image of the physical object, the physical object including a plurality of marks on a surface thereof;

a display device for displaying the image of the physical object including a plurality of virtual indices representing first positions of the plurality of marks of the physical object which are used for setting a position of a virtual model of the physical object for a user;

a processing unit for acquiring second positions of the plurality of marks of the physical object corresponding to the plurality of virtual indices in an actual space of the physical object based on interaction of the user with the plurality of marks of the physical object, wherein at least one of the plurality of virtual indices is displayed by the displaying step in a display mode so as to prompt the interaction of the user with the plurality of marks of physical object;

a correcting unit for correcting the first positions of the plurality of marks based on the second positions of the plurality of marks; and a superimposing unit for superimposing the virtual model on the image of the physical object based on the corrected first positions of the plurality of marks such that at least a predetermined number of marks of the physical object coincide with a corresponding predetermined number of virtual indices.

7. An information processing apparatus according to claim 6, wherein the predetermined number of marks of the physical object that coincide with the corresponding predetermined number of virtual indices is at least three.

8. An information processing apparatus according to claim 6 further comprising a pointing device configured to enable the user to interact with the plurality of marks of the physical object, wherein the second positions of the plurality of marks of the physical object are acquired by placing the pointing device on each of the plurality of marks of the physical object; and the virtual model is superimposed on the image of the physical object based on the corrected first positions of the plurality of marks.

9. The information processing apparatus according to claim 6, wherein the display device displays, with the image of the physical object, the virtual model and the plurality of virtual indices in a window.

10. The information processing apparatus according to claim 6, wherein the plurality of marks of the physical object includes a plurality of holes or grooves, and wherein the second positions of the plurality of marks of the physical object are acquired by placing a pointing device on a predetermined number of the holes or grooves of the physical object.

* * * * *